United States Patent
Ueno et al.

(10) Patent No.: US 9,277,202 B2
(45) Date of Patent: Mar. 1, 2016

(54) IMAGE PROCESSING DEVICE, IMAGE PROCESSING METHOD, IMAGE DISPLAY APPARATUS, AND IMAGE DISPLAY METHOD

(75) Inventors: Masafumi Ueno, Osaka (JP); Xiaomang Zhang, Osaka (JP); Yasuhiro Ohki, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 385 days.

(21) Appl. No.: 13/980,331

(22) PCT Filed: Jan. 12, 2012

(86) PCT No.: PCT/JP2012/050431
§ 371 (c)(1),
(2), (4) Date: Jul. 18, 2013

(87) PCT Pub. No.: WO2012/098974
PCT Pub. Date: Jul. 26, 2012

(65) Prior Publication Data
US 2013/0300827 A1    Nov. 14, 2013

(30) Foreign Application Priority Data

Jan. 19, 2011  (JP) ................ 2011-008406

(51) Int. Cl.
*H04N 7/12* (2006.01)
*H04N 15/00* (2006.01)
*H04N 13/00* (2006.01)
*H04N 13/02* (2006.01)

(52) U.S. Cl.
CPC ....... *H04N 13/0029* (2013.01); *H04N 13/0011* (2013.01); *H04N 13/0285* (2013.01)

(58) Field of Classification Search
CPC .......... H04N 13/0029; H04N 13/0285; H04N 13/0011
See application file for complete search history.

(56) References Cited

U.S. PATENT DOCUMENTS

| | | | |
|---|---|---|---|
| 9,094,657 B2 * | 7/2015 | Oshikiri | ................. H04N 13/00 |
| 2004/0090523 A1 * | 5/2004 | Kondo | ............... H04N 13/0018 348/46 |
| 2009/0322858 A1 | 12/2009 | Mitsuya et al. | |

(Continued)

FOREIGN PATENT DOCUMENTS

| | | |
|---|---|---|
| JP | 2000-261828 A | 9/2000 |
| JP | 2006-91412 A | 4/2006 |

(Continued)

*Primary Examiner* — Dave Czekaj
*Assistant Examiner* — Tsion B Owens
(74) *Attorney, Agent, or Firm* — Birch, Stewart, Kolasch & Birch, LLP

(57) ABSTRACT

A motion vector detecting unit 12 detects a motion vector V1 of an input image X(n), and an interpolating vector generating unit 13 generates an interpolating vector V2 in accordance with the motion vector V1. In a two-dimensional display mode, the input image X(n) is output as an original image, and an image generating unit 16 generates an interpolated image X(n+0.5) in accordance with the interpolating vector V2. In a three-dimensional display mode, the input image X(n) is output as a left-eye image L(n), and the image generating unit 16 generates a right-eye image R(n+0.5) in accordance with a sum of the interpolating vector V2 and a parallax vector V3 input from the outside. The image generating unit is shared in a frame rate conversion process and a three-dimensional conversion process, and the right-eye image is generated at the same location as the interpolated image in time axis. In this way, image quality is increased when a moving image is displayed with a small amount of circuit.

14 Claims, 16 Drawing Sheets

(56) References Cited

U.S. PATENT DOCUMENTS

2011/0181593 A1* 7/2011 Hirai .................. H04N 13/0022
 345/427
2014/0028793 A1* 1/2014 Wiegand ............ H04N 13/0011
 348/42

FOREIGN PATENT DOCUMENTS

| JP | 2010-11184 A | 1/2010 |
|---|---|---|
| JP | 2011-39475 A | 2/2011 |

* cited by examiner

IMAGE PROCESSING DEVICE, IMAGE PROCESSING METHOD, IMAGE DISPLAY APPARATUS, AND IMAGE DISPLAY METHOD

TECHNICAL FIELD

The present invention relates to image processing devices, image processing methods, image display apparatuses, and image display methods. In particular, the present invention relates to an image processing device, an image processing method, an image display apparatus, and an image display method, for selectively executing a frame rate conversion process and a three-dimensional conversion process.

BACKGROUND ART

Three-dimensional display (stereo display) to provide stereoscopic display using parallax between the two eyes has gained attention recently. A known image display apparatus has a three-dimensional function that converts a two-dimensional display image into a three-dimensional display image in order to provide a three dimensional display in accordance with the two-dimensional display image. As opposed to this apparatus, another known image display apparatus has a frame rate conversion function that converts a frame rate of an image in order to increase image quality when a moving image is displayed.

Typically, an image display apparatus providing the three-dimensional display has both the frame rate conversion function and a three-dimensional conversion function. FIG. 17 is a block diagram illustrating the configuration of a known image processing device included in the image display apparatus that provides the three-dimensional display. The image processing device 90 of FIG. 17 includes an input selection unit 91, a frame rate converting unit 92, a three-dimensional converting unit 93, and a time base converting unit 94. The frame rate of an input image of the image processing device 90 is 60 Hz, and the frame rate of an output image is 120 Hz.

In a two-dimensional display mode, the input selection unit 91 outputs the input signal to the frame rate converting unit 92. The frame rate converting unit 92 outputs the input signal without any change added thereon as an original signal. The frame rate converting unit 92 also performs a frame rate conversion process on the input image through motion compensation, and outputs a resulting interpolated image. In a three-dimensional display mode, the input selection unit 91 outputs the input signal to the three-dimensional converting unit 93. The three-dimensional converting unit 93 performs a three-dimensional conversion process on the input signal using a motion vector, and outputs resulting left-eye image and right-eye image. The time base converting unit 94 outputs the original image and the interpolated image, output from the frame rate converting unit 92, or outputs the left-eye image and the right-eye image, output from the three-dimensional converting unit 93, in synchronization with display timings thereof.

With reference to the present invention, Patent Literature 1 describes a video signal processing device that selectively perform a process of outputting a three-dimensional display image without any change added thereon, and a process of outputting a two-dimensional display image with a frame rate thereof converted. Patent Literature 2 describes a stereo video generation method configured to detect a motion vector of an image, configured to estimate depth information of the image using the detected motion vector, and configured to perform a three-dimensional conversion process in accordance with the estimated depth information.

CITATION LIST

Patent Literature

PTL 1: Japanese Unexamined Patent Application Publication No. 2010-11184
PTL 2: Japanese Unexamined Patent Application Publication No. 2000-261828

SUMMARY OF INVENTION

Technical Problem

The three-dimensional converting unit 93 in the image processing device 90 of FIG. 17 generates the left-eye image and the right-eye image at the same location in the time axis. Since the left-eye image and the right-eye image are alternately recognized when the three-dimensional display is provided, the image quality of a moving image display Increases if the left-eye image and the right-eye image are generated with one image shifted from the other by a 0.5 frame period (see FIG. 3 described below). The image processing device 90 thus presents a low quality problem in the moving image display.

A method contemplated to overcome this problem includes detecting a motion vector in accordance with the left-eye image and the right-eye image output from the three-dimensional converting unit 93, and re-generating the right-eye image using the detected motion vector. However, since this method causes the frame rate of the image to be processed by the three-dimensional converting unit 93 to double (to 120 Hz), the memory size of a frame memory and a processing speed of the three-dimensional converting unit 93 also need to be doubled. This method also suffers from an increase in an amount of circuit.

The object of the present invention is thus to increase the image quality of the moving image display with a small amount of circuit, in conjunction with an image processing device, an image processing method, an image display apparatus, and an image display method.

Solution to Problem

According to a first aspect of the present invention, there is provided an image processing device.

The image processing device selectively executes a frame rate conversion process and a three-dimensional conversion process, and includes a vector detecting unit that detects a motion vector of an input image, an interpolating vector generating unit that, in accordance with the motion vector, generates an interpolating vector needed for the frame rate conversion process, a vector generating unit that, as a vector for use in image generating, outputs the interpolating vector in a two-dimensional display mode, and outputs a sum of a parallax vector needed for the three-dimensional conversion process, and the interpolating vector in a three-dimensional display mode, and an image generating unit that, in accordance with the vector for use in the image generating and the input image, generates an image that is to be output together with the input image. In the two-dimensional display mode, the input image is output as an original image, and the image generating unit generates an interpolated image while in the three-dimensional display mode, the input image is output as one of a left-eye image and a right-eye image included in a three-dimensional display image, and the image generating unit generates another image included in the three-dimensional display image.

According to a second aspect of the present invention, in the first aspect of the present invention, the vector generating unit includes a vector summing unit that sums the interpolating vector and the parallax vector, and a vector selecting unit that selects between the interpolating vector and the vector determined by the vector summing unit.

According to a third aspect of the present invention, in the first aspect of the present invention, the parallax vector is input separately from an image signal representing the input image.

According to a fourth aspect of the present invention, in the first aspect of the present invention, the parallax vector with an image signal representing the input image attached thereto is input.

According to a fifth aspect of the present invention, in the first aspect of the present invention, the image processing device further includes a depth information estimating unit that generates the parallax vector in accordance with the input image.

According to a sixth aspect of the present invention, in the first aspect of the present invention, the vector generating unit includes a parallax adjusting unit that varies the parallax vector in accordance with adjustment information that is provided.

According to a seventh aspect of the present invention, in the sixth aspect of the present invention, the vector generating unit further includes a vector summing unit that sums the interpolating vector and a vector determined by the parallax adjusting unit, and a vector selecting unit that selects between the interpolating vector and the vector determined by the vector summing unit.

According an eighth aspect of the present invention, in the sixth aspect of the present invention, the parallax adjusting unit multiples the parallax vector by a gain in accordance with the adjustment information.

According to a ninth aspect of the present invention, in the sixth aspect of the present invention, the parallax adjusting unit adds an offset to the parallax vector in accordance with the adjustment information.

According a tenth aspect of the present invention, in the sixth aspect of the present invention, the parallax adjusting unit performs on the parallax vector an operation different depending on a location in an image in accordance with the adjustment information.

According to an eleventh aspect of the present invention, in the first aspect of the present invention, the image generating unit generates a page of the interpolated image in response to a page of the input image in the two-dimensional display mode, and generates a page of image for an eye opposite the input image in response to the page of the input image in the three-dimensional display mode.

According to a twelfth aspect of the present invention, in the first aspect of the present invention, the image generating unit generates (2m−1) pages of the interpolated image in response to a page of the input image in the two-dimensional display mode (m is an integer equal to or above 2), and generates (m−1) pages of image for the same eye as the input image in response to the page of the input image, and m pages of image for the opposite eye in the three-dimensional display mode.

According a thirteenth aspect of the present invention, there is provided an image process method. The image processing method configured to selectively execute a frame rate conversion process and a three-dimensional conversion process, includes a step of detecting a motion vector of an input image, a step of generating, in accordance with the motion vector, an interpolating vector needed for the frame rate conversion process, a step of outputting, as a vector for use in image generating, the interpolating vector in a two-dimensional display mode, and outputting a sum of a parallax vector needed for the three-dimensional conversion process, and the interpolating vector in a three-dimensional display mode, and a step of generating, in accordance with the vector for use in the image generating and the input image, an image that is to be output together with the input image. In the two-dimensional display mode, the input image is output as an original image, and an interpolated image is generated in the step of generating the image while in the three-dimensional display mode, the input image is output as one of a left-eye image and a right-eye image included in a three-dimensional display image, and another image included in the three-dimensional display image is generated in the step of generating the image.

According a fourteenth aspect of the present invention, there is provided an image display apparatus. The image display apparatus displays an image by selectively executing a frame rate conversion process and a three-dimensional conversion process, and includes a display panel, an image processing device that selectively executes the frame rate conversion process and the three-dimensional conversion process on an input image, and a drive circuit that drives the display panel so that an image output from the image processing device is displayed. The image processing device includes a vector detecting unit that detects a motion vector of the input image, an interpolating vector generating unit that, in accordance with the motion vector, generates an interpolating vector needed for the frame rate conversion process, a vector generating unit that, as a vector for use in image generating, outputs the interpolating vector in a two-dimensional display mode, and outputs a sum of a parallax vector needed for the three-dimensional conversion process, and the interpolating vector in a three-dimensional display mode, and an image generating unit that, in accordance with the vector for use in the image generating and the input image, generates an image that is to be output together with the input image. In the two-dimensional display mode, the input image is output as an original image, and the image generating unit generates an interpolated image while in the three-dimensional display mode, the input image is output as one of a left-eye image and a right-eye image included in a three-dimensional display image, and the image generating unit generates another image included in the three-dimensional display image.

According to a fifteenth aspect of the present invention, there is provided an image display method. The image display method configured to display an image by selectively executing a frame rate conversion process and a three-dimensional conversion process, includes a step of detecting a motion vector of an input image, a step of generating, in accordance with the motion vector, generates an interpolating vector needed for the frame rate conversion process, a step of outputting, as a vector for use in image generating, the interpolating vector in a two-dimensional display mode, and outputting a sum of a parallax vector needed for the three-dimensional conversion process, and the interpolating vector in a three-dimensional display mode, a step of generating, in accordance with the vector for use in the image generating and the input image, an image that is to be output together with the input image, and a step of driving a display panel to display the input image and the image generated in the step of generating the image. In the two-dimensional display mode, the input image is output as an original image, and an interpolated image is generated in the step of generating the image while in the three-dimensional display mode, the input image is output as one of a left-eye image and a right-eye image included in a three-dimensional display image, and another image included in the three-dimensional display image is generated in the step of generating the image.

Advantageous Effects Of Invention

According to the first, second, or third aspect of the present invention, one of the left-eye image and the right-eye image, included in the three-dimensional display image, is generated in accordance with a vector as the sum of the parallax vector and the interpolating vector. In this way, one of the left-eye image and the right-eye image is generated at the same location as that of the interpolated image in the time axis. As a result, the image quality of the moving image displaying is increased while the three-dimensional conversion process is performed. Since the image generating unit is shared in the frame rate conversion process and the three-dimensional conversion process, the image quality of the moving image displaying is increased with a small amount of circuit.

According to the third aspect of the present invention, the image quality of the moving image displaying is increased with the three-dimensional conversion process being performed when the parallax vector is input separately from the image signal.

According to the fourth aspect of the present invention, the image quality of the moving image displaying is increased with the three-dimensional conversion process being performed when the image signal with the parallax vector attached thereto is input.

According to the fifth aspect of the present invention, even if the parallax vector is unknown, the image quality of the moving image displaying is improved with the three-dimensional conversion process being performed because the depth information estimating unit generates the parallax vector.

According to the sixth or seventh aspect of the present invention, an amount of projection in a third-dimension display is easily adjusted by varying the parallax vector in accordance with the adjustment information.

According to the eighth aspect of the present invention, the parallax vector is easily varied by multiplying the parallax vector by the gain in accordance with the adjustment information, and as a result, the amount of projection in the third-dimension display is easily adjusted.

According to the ninth aspect of the present invention, the parallax vector is easily varied by multiplying the parallax vector by the gain in accordance with the adjustment information, and as a result, switching in the three-dimensional display between placing a priority on the amount of projection and placing a priority on the depth is easily performed by varying the parallax vector easily.

According to the tenth aspect of the present invention, the parallax vector is appropriately varied by performing on the parallax vector the operation different depending on the location within the image in accordance with the adjustment information, and as a result, the amount of projection in the three-dimensional displaying may be adjusted depending on the location within the image.

According to the eleventh aspect of the present invention, a speed-doubling conversion process is performed to double the frame rate of the image in the two-dimensional display mode. The three-dimensional conversion process is performed to convert the page of the input image into the page of the light-eye image and the page of the left-eye image page in the three-dimensional display mode.

According to the twelfth aspect of the present invention, a speed-multiplied-by-2m conversion process is performed to multiply the frame rate of the image by 2m in the two-dimensional display mode. The three-dimensional conversion process is performed to convert the page of the input image into m pages of left-eye image and m pages of right-eye image in the three-dimensional display mode.

According to the fourteenth or fifteenth aspect of the present invention, one of the left-eye image and the right-eye image is generated at the same location as the interpolated image in time axis by sharing the image generating unit in the frame rate conversion process and the three-dimensional conversion process, and the image quality of the moving image displaying is thus increased with a small amount of circuit.

DESCRIPTION OF EMBODIMENTS

First Embodiment

Figure 1:
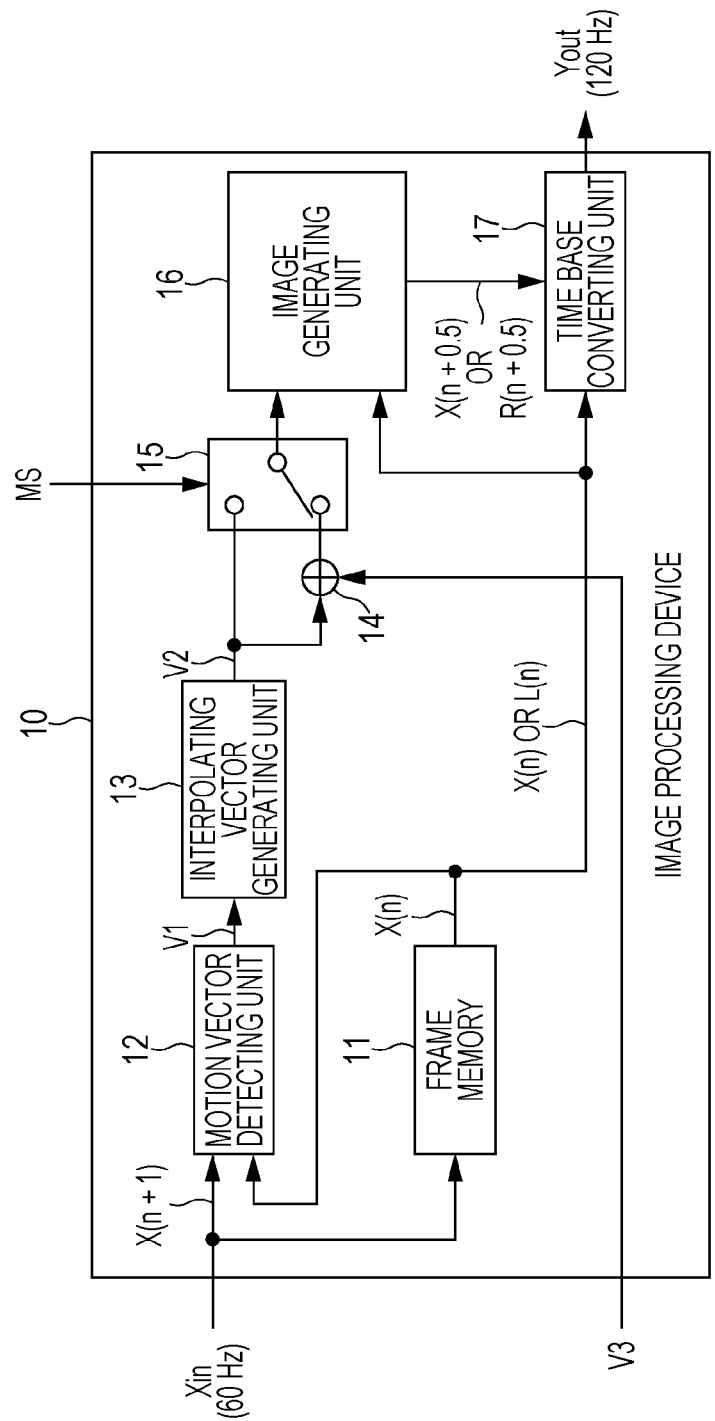
FIG. 1 is a block diagram illustrating the configuration of an image processing device of a first embodiment of the present invention.

FIG. 1 is a block diagram illustrating the configuration of the information processing apparatus of a first embodiment of the present invention. The image processing device 10 of FIG. 1 includes a frame memory 11, a motion vector detecting unit 12, an interpolating vector generating unit 13, a vector summing unit 14, a vector selecting unit 15, an image generating unit 16, and a time base converting unit 17. The image processing device 10 selectively performs a frame rate conversion process and a three-dimensional conversion process on an input image.

Figure 2:
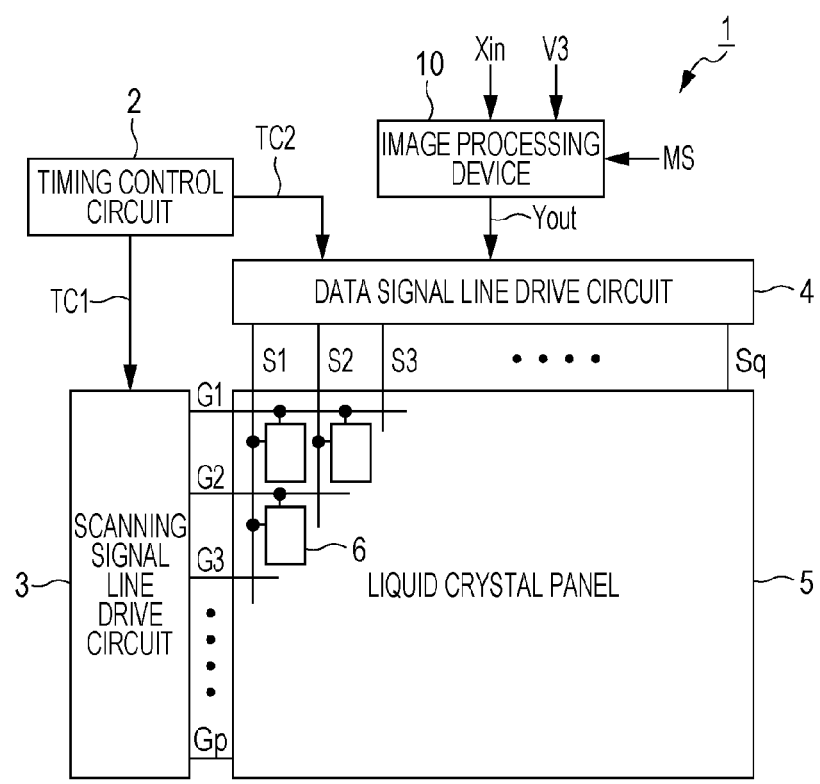
FIG. 2 is a block diagram illustrating an image display apparatus including the image processing device of FIG. 1.

FIG. 2 is a block diagram illustrating the configuration of a liquid-crystal display apparatus including the image processing device 10. The liquid-crystal display apparatus 1 of FIG. 2 includes, in addition to the image processing device 10, a timing control circuit 2, a scanning signal line drive circuit 3, a data signal line drive circuit 4, and a liquid crystal panel 5. The liquid crystal panel 5 includes p scanning signal lines G1 to Gp, q data signal lines S1 to Sq, and (pxq) pixel circuits 6. The scanning signal lines G1 to Gp are arranged in parallel with each other, and the data signal lines S1 to Sq are arranged in parallel with each other so as to intersect the scanning signal lines G1 to Gp. The (pxq) pixel circuits 6 are respectively disposed near intersections between the scanning signal lines G1 to Gp and the data signal lines S1 to Sq.

The liquid-crystal display apparatus 1 receives, from the outside, an image signal Xin and a parallax vector V3 needed to perform the three-dimensional conversion process. The image signal Xin represents an input signal having a frame rate of 60 Hz. The image processing device 10 receives the image signal Xin, the parallax vector V3, and a mode selection signal MS that indicates whether a mode in use is a two-dimensional display mode or a three-dimensional display mode. In response to the mode selection signal MS, the image processing device 10 selectively performs the frame rate conversion process and the three-dimensional conversion process, and then outputs an image signal Yout. The image signal Yout represents an output signal having a frame rate of 120 Hz.

The timing control circuit 2 applies timing control signals TC1 and TC2 to the scanning signal line drive circuit 3 and the data signal line drive circuit 4, respectively. In response to the timing control signal TC1, the scanning signal line drive circuit 3 drives the scanning signal lines G1 to Gp. The data signal line drive circuit 4 drives the data signal lines S1 to Sq in response to the timing control signal TC2 and the image signal Yout. The scanning signal line drive circuit 3 and the data signal line drive circuit 4 work as drive circuits of the liquid crystal panel 5 in this way. The liquid-crystal display apparatus 1 selectively provides a two-dimensional display and a three-dimensional display, each having a frame rate of 120 Hz by driving the liquid crystal panel 5 using these drive circuits.

Referring back to FIG. 1, the image processing device 10 is described in detail. The n-th input image represented by the image signal Xin is referred to as an input image X(n). In the two-dimensional display mode, the image processing device 10 performs the frame rate conversion process through motion compensation, thereby converting the frame rate of the input image from 60 Hz to 120 Hz. In such a case, the image processing device 10 outputs the input image X(n) without any change added thereon as an original image. The image generating unit 16 generates an interpolated image X(n+0.5) located in between the input images X(n) and X(n+1) in the time axis.

On the other hand, in the three-dimensional display mode, the image processing device 10 performs the three-dimensional conversion process using a motion vector with the input image treated as a two-dimensional display image. The image processing device 10 thus converts the input image into a three-dimensional display image including a left-eye image and a right-eye image. The following discussion is based on the premise that the image processing device 10 outputs the input image X(n) without any change added thereon as a left-eye image L(n) and that the image generating unit 16 generates a right-eye image R(n+0.5) at the same location as the interpolated image X(n+0.5) in the time axis in response to the input image X(n).

Alternatively, the image processing device 10 may output the input image X(n) without any change added thereon as a right-eye image R(n) and the image generating unit 16 may generate a left-eye image L(n+0.5) at the same location as the interpolated image X(n+0.5) in the time axis in response to the input image X(n).

The operation of the image processing device 10 responsive to the input image X(n+1) is described below. The frame memory 11 stores a frame of the image signal Xin, delays the frame by one frame period, and then outputs the delayed frame. When the input image X(n+1) is input, the frame memory 11 stores the input image X(n+1) while outputting the input image X(n).

The motion vector detecting unit 12 detects the motion vector V1 of the input image X(n). More in detail, the motion vector detecting unit 12 receives the input image X(n+1), and the input image X(n) output from the frame memory 11. The motion vector detecting unit 12 detects the motion vector V1 between two images in response to two consecutive input images X(n) and X(n+1) on a per block basis (block represents a small area resulting from segmenting the image). The motion vector detecting unit 12 detects the motion vector V1 on a per block basis using the gradient technique or block matching technique. The detected motion vector V1 is applied to the interpolating vector generating unit 13. It is noted that the motion vector detecting unit 12 may employ any detection method of the motion vector.

In response to the motion vector V1, the interpolating vector generating unit 13 generates an interpolating vector V2 needed to perform the frame rate conversion process. For example, if an object is present at location Pa in the input image X(n) and at location Pb in the input image X(n+1), the same object may be at location Pc in between locations Pa and Pb in the interpolated image X(n+0.5). In such a case, the interpolating vector generating unit 13 generates the interpolating vector V2 that moves the object from the location Pa to the location Pb.

The parallax vector V3 is input separately from the image signal Xin. The vector summing unit 14 sums the interpolating vector V2 generated by the interpolating vector generating unit 13 and the parallax vector V3 input from the outside. The sum (V2+V3) of the interpolating vector and the parallax vector, determined by the vector summing unit 14, is applied to the vector selecting unit 15. In response to the mode selection signal MS, the vector selecting unit 15 selects the interpolating vector V2 in the two-dimensional display mode and selects the sum (V2+V3) of the interpolating vector and the parallax vector in the three-dimensional display mode. The vector summing unit 14 and the vector selecting unit 15 work as a vector generating unit that outputs, as a vector for use in image generating, the interpolating vector in the two-dimensional display mode and the sum of the interpolating vector and the parallax vector in the three-dimensional display mode.

The image generating unit 16 generates an image to be output together with the input image X(n), in accordance with a vector selected by the vector selecting unit 15 (namely, a vector generated by the vector generating unit) and the input image X(n) output from the frame memory 11. The time base converting unit 17 outputs the input image X(n) output from the frame memory 11 and the image generated by the image generating unit 16 in synchronization with display timing.

More in detail, in the two-dimensional display mode, the input image X(n) is output without any change added thereon as an original image to the time base converting unit 17. The image generating unit 16 generates the interpolated image X(n+0.5) located between the two input images X(n) and X(n+1) in the time axis in accordance with the interpolating vector V2 selected by the vector selecting unit 15 and the input image X(n). The time base converting unit 17 outputs the input image X(n) and the interpolated image X(n+0.5) in that order at a rate of 120 Hz. In the three-dimensional display mode, the input image X(n) is output without any change added thereon as the left-eye image L(n) to the time base converting unit 17. The image generating unit 16 generates the right-eye image R(n+0.5) at the same location as the interpolated image X(n+0.5) in the time axis in accordance with the sum (V2+V3) of the interpolating vector and the parallax vector selected by the vector selecting unit 15 and the input image X(n). The time base converting unit 17 outputs the left-eye image L(n) and the right-eye image R(n+0.5) in that order at a rate of 120 Hz.

The image generating unit 16 generates a page of interpolated image X(n+0.5) in response to a page of input image X(n) in the two-dimensional display mode. The image generating unit 16 generates a page of image (the right-eye image R(n+0.5)) for an eye opposite the input image X(n) (the left-eye image L(n)) in response to a page of input image X(n) in the three-dimensional display mode. In this way, the image processing device 10 performs a speed-doubling conversion process to double the frame rate of the image in the two-dimensional display mode, and performs the three-dimensional conversion process to convert a page of input image into a page of left-eye image and a page of right-eye image in the three-dimensional display mode.

The interpolating vector V2 indicates part of the input image X(n) from which each block of the interpolated image X(n+0.5) is to be derived. The parallax vector V3 indicates part of the left-eye image L(n) from which each block of the right-eye image R(n) is to be derived. The sum (V2+V3) of the interpolating vector and the parallax vector indicates part of the input image X(n) from which each block of the right-eye image R(n+0.5) at the same location as the interpolated image X(n+0.5) in the time axis is to be derived. The image generating unit 16 may easily generate the right-eye image R(n+0.5) at the same location as the interpolated image X(n+0.5) in the time axis in accordance with the sum (V2+V3) of the interpolating vector and the parallax vector and the input image X(n).

Figure 3:
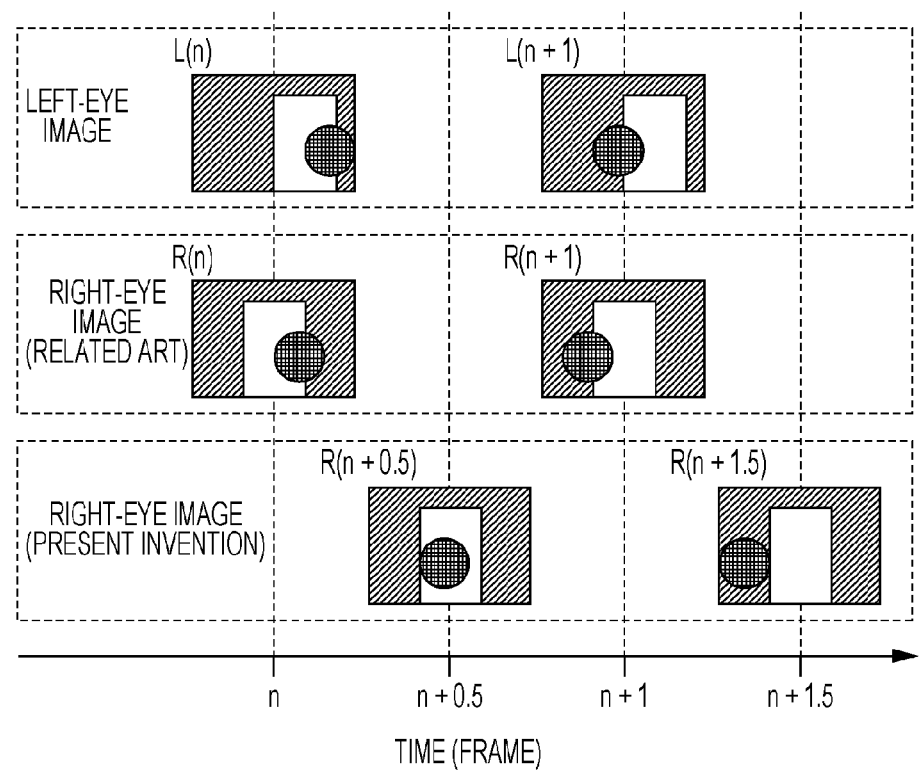
FIG. 3 illustrates the location of an right-eye image in a time axis generated by the image processing device of FIG. 1.
Figure 17:
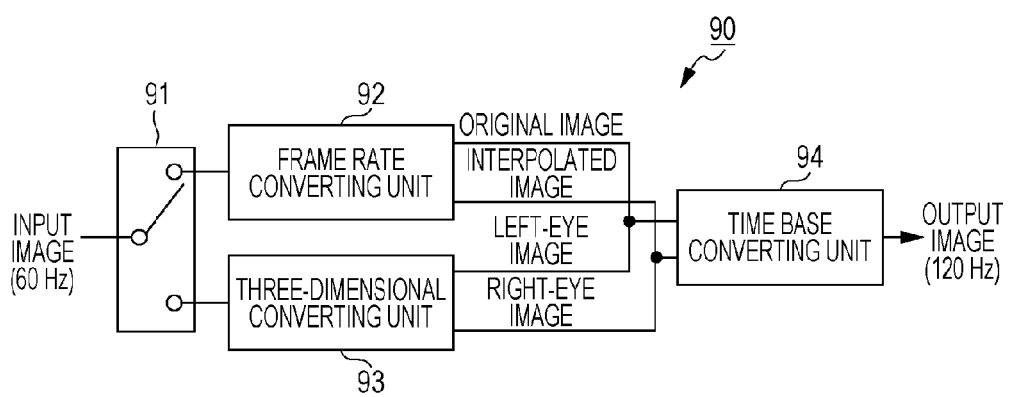
FIG. 17 is a block diagram illustrating the configuration of an image processing device in the related art.

FIG. 3 illustrates a location of the right-eye image in the time axis generated by the image processing device 10. In the image of FIG. 3, a spherical object of a checkered pattern moves leftward in front of a white object. The upper portion of FIG. 3 illustrates the locations of the left-eye image in the image processing device 90 in the related art (FIG. 17) and the left-eye image in the image processing device 10. The intermediate and lower portions of FIG. 3 illustrate the locations of the right-eye images generated by the image processing device 90 in the related art and the image processing device 10, respectively.

As illustrated in the upper and intermediate portions of FIG. 3, the image processing device 90 in the related art outputs a left-eye image L(n) at the location of an n-th frame, a right-eye image R(n) at the location of the n-th frame, a left-eye image L(n+1) at the location of an (n+1)-th frame, and a right-eye image R(n+1) at the location of the (n+1)-th frame in that order. In this way, the image processing device 90 in the related art generates the right-eye image at the same location as the left-eye image in the time axis.

In contrast, as illustrated in the intermediate and lower portions of FIG. 3, the image processing device 10 outputs a left-eye image L(n) at the location of an n-th frame, a right-eye image R(n+0.5) at the location of an (n+0.5)-th frame, a left-eye image L(n+1) at the location of an (n+1)-th frame, and a right-eye image R(n+1.5) at the location of an (n+1.5)-th frame in that order. In this way, the image processing device 10 generates the right-eye image in between the two pages of left-eye image in the time axis.

When the three-dimensional displaying is performed, the left-eye image and the right-eye image are alternately recognized. The location where the right-eye image is to be generated should be in the middle position between the two pages of left-eye image. The image quality of the moving image displaying becomes higher when the right-eye image is generated between the two pages of left-eye images in the time axis than when the right-eye image is generated at the same location as the left-eye image in the time axis.

The image processing device 10 generates the right-eye image R(n+0.5) in accordance with the sum (V2+V3) of the interpolating vector and the parallax vector. More specifically, the image processing device 10 sums vectors and generates an image based on vector summing results in the three-dimensional display mode. On the other hand, it is contemplated that a right-eye image is generated and motion compensation is applied to the resulting right-eye image in a method to generate the right-eye image between the two pages of left-eye image without summing the vectors. However, this method needs a new frame memory to generate image, and suffers from the occurrence of a delay time in the image generating. This method also suffers from the problem that substantial image degradation is caused twice by an erroneous detection of a motion vector, namely, once in the generation of the right-eye image and once in the application of the motion compensation to the right-eye image. The image processing device 10 is free from these problems because the image processing device 10 performs the vector summing prior to the image generating.

As described above, when the frame rate conversion process is performed using the motion compensation, the image processing device 10 of the present embodiment generates the interpolated image X(n+0.5) in accordance with the interpolating vector V2. When the three-dimensional conversion process is performed using the motion vector, the image processing device 10 generates the right-eye image R(n+0.5) in accordance with the sum (V2+V3) of the interpolating vector and the parallax vector. The image processing device 10 of the present embodiment generates the right-eye image (or the left-eye image) included in the three-dimensional display image at an interpolation position in the time axis using the motion compensation. The image processing device 10 thus increases the image quality in the moving image displaying while performing the three-dimensional conversion process.

In the image processing device 10 of the present embodiment, both the interpolated image X(n+0.5) and the right-eye image R(n+0.5) are generated by the image generating unit 16. In the image processing device 10 of the present embodiment, the image generating unit 16 is shared in the frame rate conversion process and the three-dimensional conversion process. The image quality of the moving image displaying is thus increased with a small amount of circuit.

Figure 4:
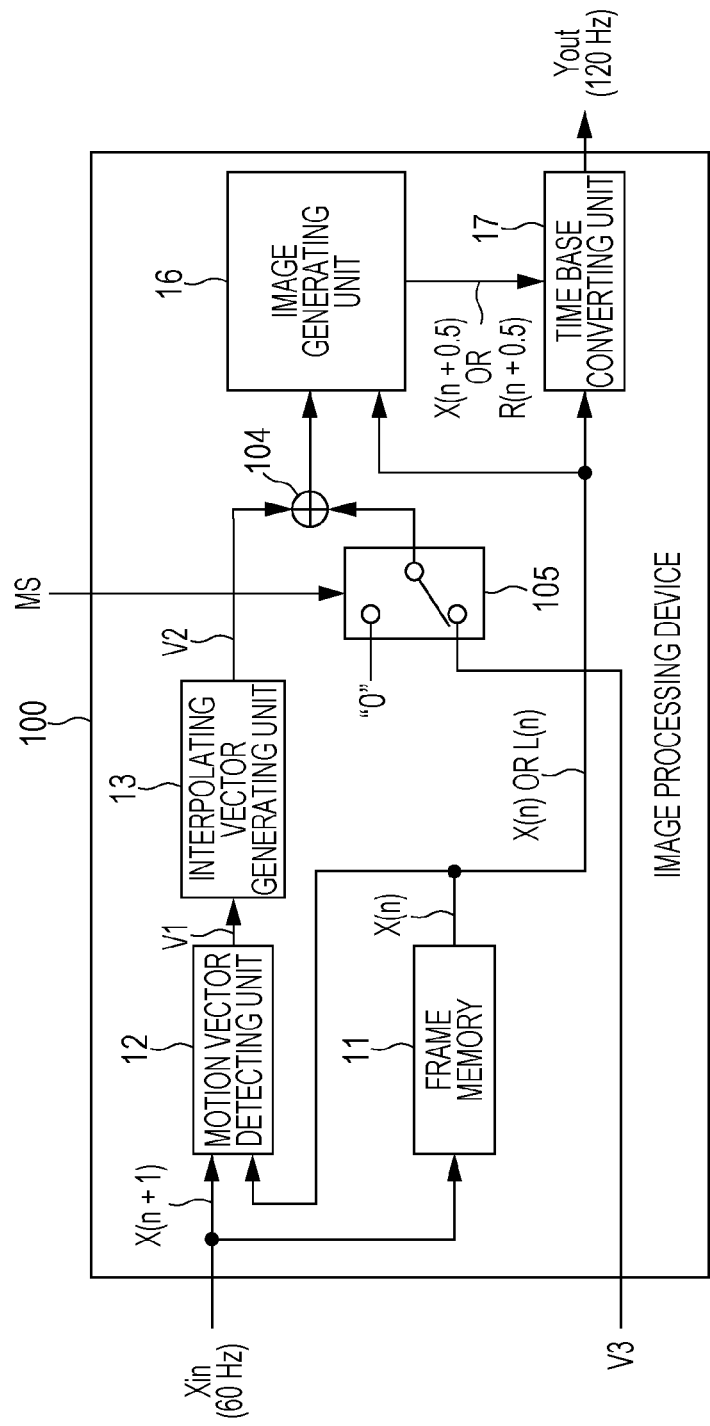
FIG. 4 is a block diagram illustrating the configuration of an image processing device as a modification of the image processing device of the first embodiment of the present invention.

The present embodiment may be modified to a modification example as illustrated in FIG. 4. In the image processing device 100 of FIG. 4, a vector selecting unit 105 selects a zero vector (labeled "0" as illustrated) in the two-dimensional display mode and selects the parallax vector V3 input from the outside in the three-dimensional display mode. A vector summing unit 104 sums the interpolating vector V2 generated by the interpolating vector generating unit 13, and the vector selected by the vector selecting unit 105. The vector summing unit 104 and the vector selecting unit 105 work as a vector generating unit that outputs, as a vector for use in the image generating, the interpolating vector in the two-dimensional display mode and outputs the sum of the interpolating vector and the parallax vector in the three-dimensional display mode. The image processing device 100 thus operates in the same way as the image processing device 10 and provides the same effects as those of the image processing device 10.

Second Embodiment

Figure 5:
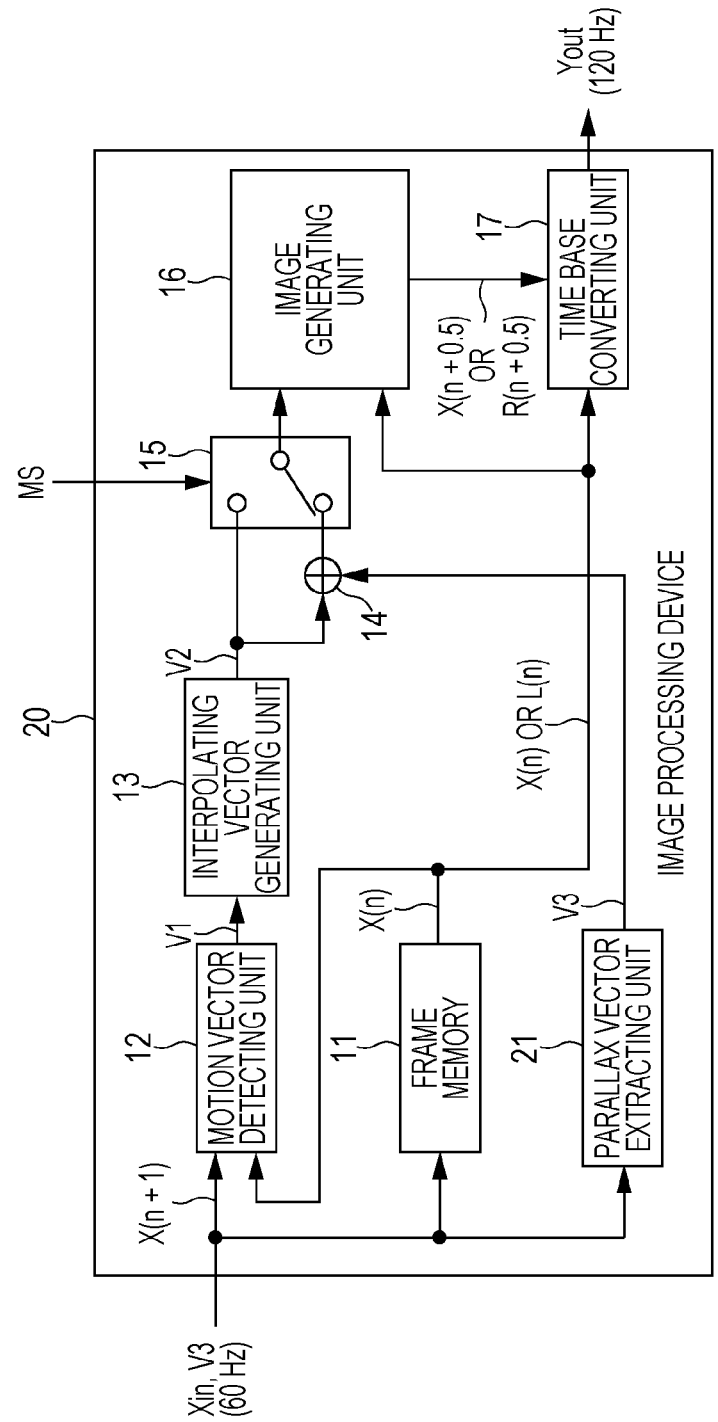
FIG. 5 is a block diagram illustrating the configuration of the image processing device of a second embodiment of the present invention.

FIG. 5 is a block diagram illustrating the configuration of the image processing device of a second embodiment of the present invention. The image processing device 20 is the image processing device 10 (FIG. 1) of the first embodiment but with a parallax vector extracting unit 21 added thereto. Like the image processing device 10, the image processing device 20 is used in a built-in state in the liquid-crystal display apparatus 1 (FIG. 2). In each of the following embodiments to be discussed below, elements identical to those described with reference to the first embodiment are designated with the same reference symbols and the discussion thereof is omitted.

Like the image processing device 10, the image processing device 20 receives the image signal Xin, the parallax vector V3, and the mode selection signal MS. However, the image processing device 20 receives the image signal Xin with the parallax vector V3 attached thereto. The parallax vector extracting unit 21 extracts the parallax vector V3 attached to the image signal Xin. The extracted parallax vector V3 is input to the vector summing unit 14. In the three-dimensional display mode, the right-eye image R(n+0.5) at the same location as the interpolated image X(n+0.5) in the time axis is generated in accordance with the input image X(n) and the sum (V2+V3) of the interpolating vector and the parallax vector.

As described above, the image processing device 20 receives the parallax vector V3 in a state attached to the image signal Xin representing the input image. When the parallax vector is input in the state attached to the image signal, the image processing device 20 of the present embodiment increases the image quality of the moving image displaying while performing the three-dimensional conversion process.

Figure 6:
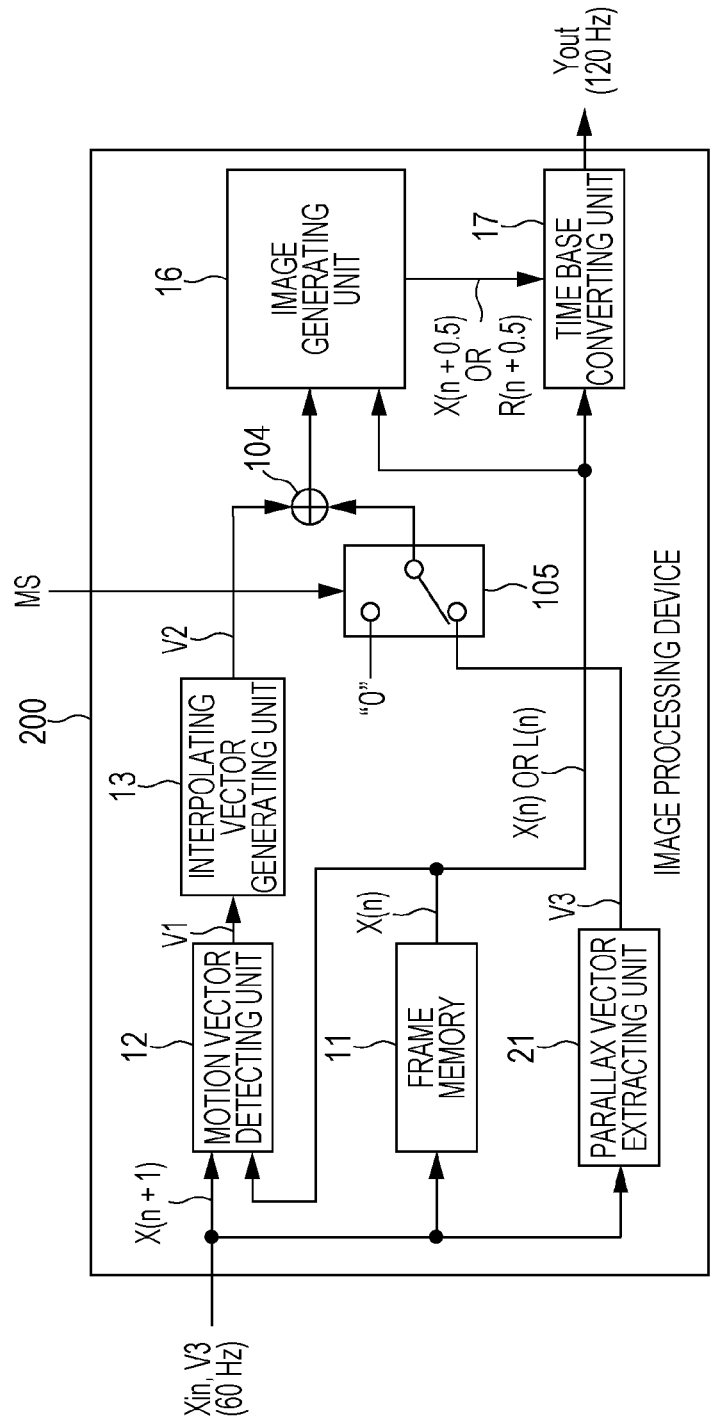
FIG. 6 is a block diagram illustrating the configuration of an image processing device as a modification of the image processing device of the second embodiment of the present invention.

The present embodiment may be modified to a modification example of FIG. 6. In an image processing device 200 of FIG. 6, the vector summing unit 104 and the vector selecting unit 105 work as a vector generating unit that outputs, as a vector for use in the image generating, the interpolating vector in the two-dimensional display mode and outputs the sum of the interpolating vector and the parallax vector in the three-dimensional display mode. The image processing device 200 thus operates in the same way as the image processing device 20 and provides the same effects as those of the image processing device 20.

Third Embodiment

Figure 7:
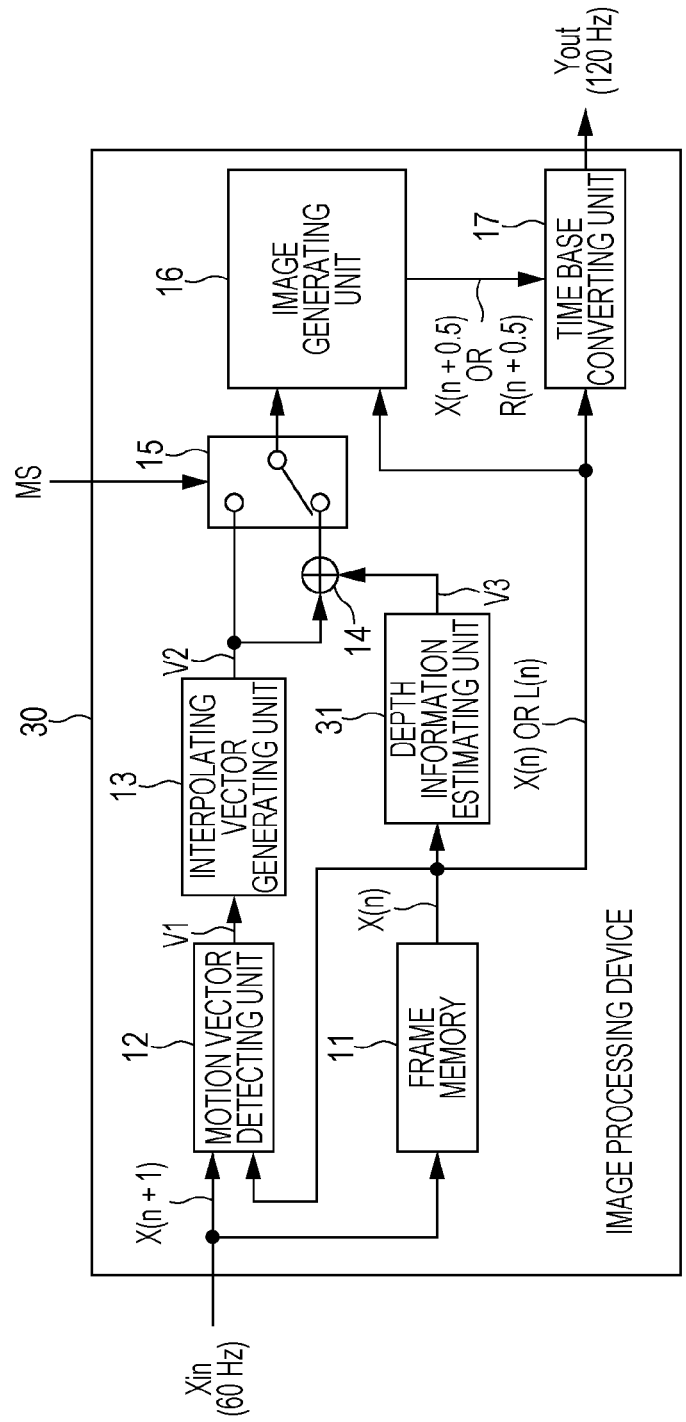
FIG. 7 is a block diagram illustrating the configuration of the image processing device of a third embodiment of the present invention.

FIG. 7 is a block diagram illustrating the configuration of the information processing device of a third embodiment of the present invention. The image processing device 30 of FIG. 7 is the image processing device 10 (FIG. 1) of the first embodiment but with a depth information estimating unit 31 added thereto. Like the image processing device 10, the image processing device 30 is used in a built-in state in the liquid-crystal display apparatus 1 (FIG. 2).

The image processing device 30 receives the image signal Xin and the mode selection signal MS but does not receive the parallax vector V3. Using any method, the depth information estimating unit 31 generates the parallax vector V3, needed for the three-dimensional conversion process, in accordance with the input image X(n) output from the frame memory 11. For example, the depth information estimating unit 31 may detect the parallax vector V3 in accordance with the input image X(n) and the motion vector V1 detected by the motion vector detecting unit 12. The detected parallax vector V3 is input to the vector summing unit 14. In the three-dimensional display mode, the right-eye image R(n+0.5) is generated at the same location as the interpolated image X(n+0.5) in the time axis in accordance with the input image X(n) and the sum (V2+V3) of the interpolating vector and the parallax vector.

As described above, the image processing device 30 of the present invention includes the depth information estimating unit 31 that generates the parallax vector V3 in accordance with the input image. Even if the parallax vector is unknown, the depth information estimating unit 31 in the image processing device 30 of the present embodiment generates a parallax vector. The image processing device 30 of the present embodiment increases the image quality of the moving image displaying while performing the three-dimensional conversion process.

Figure 8:
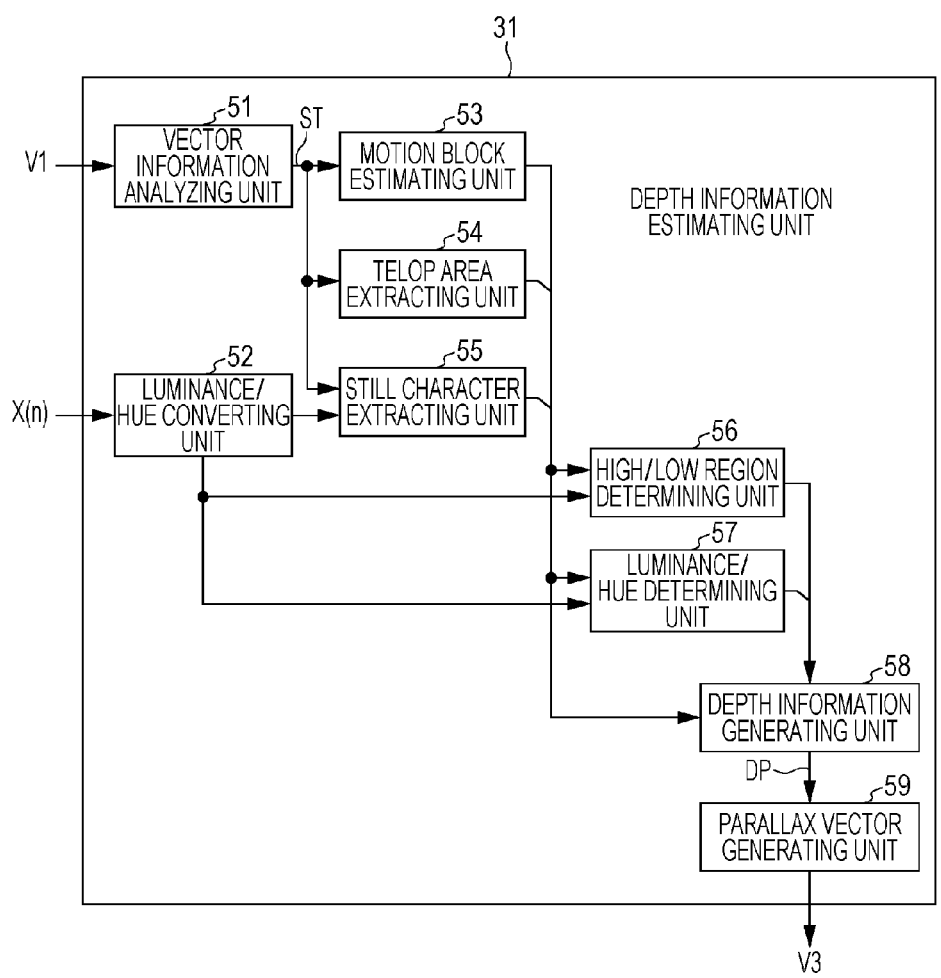
FIG. 8 is a block diagram illustrating the detailed configuration of an information estimating unit of the image processing device of FIG. 7.

Described below is the depth information estimating unit 31 that detects the parallax vector V3 in accordance with the input image X(n) and the motion vector V1. FIG. 8 is a block diagram illustrating the detailed configuration of the depth information estimating unit 31. The depth information estimating unit 31 of FIG. 8 includes a vector information analyzing unit 51, a luminance/hue converting unit 52, a motion block estimating unit 53, a telop area extracting unit 54, a still character extracting unit 55, a high/low region determining unit 56, a luminance/hue determining unit 57, a depth information generating unit 58, and a parallax vector generating unit 59.

Figure 9A:
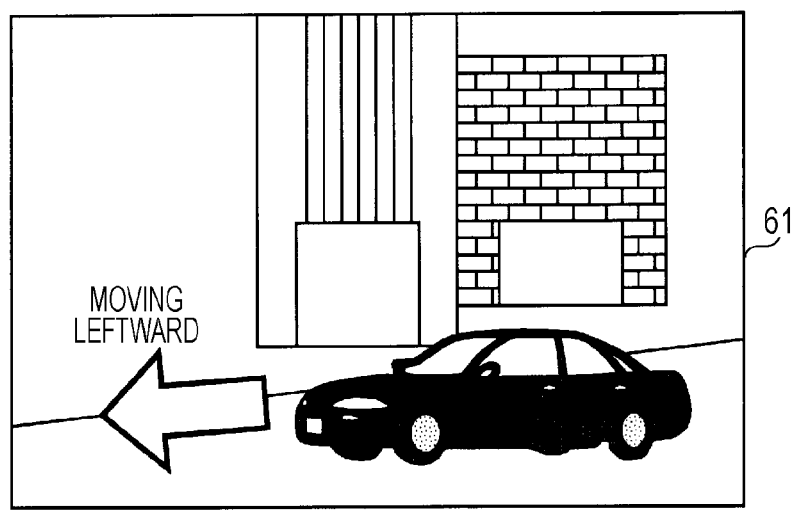
FIG. 9A illustrates an example of a moving image.
Figure 9B:
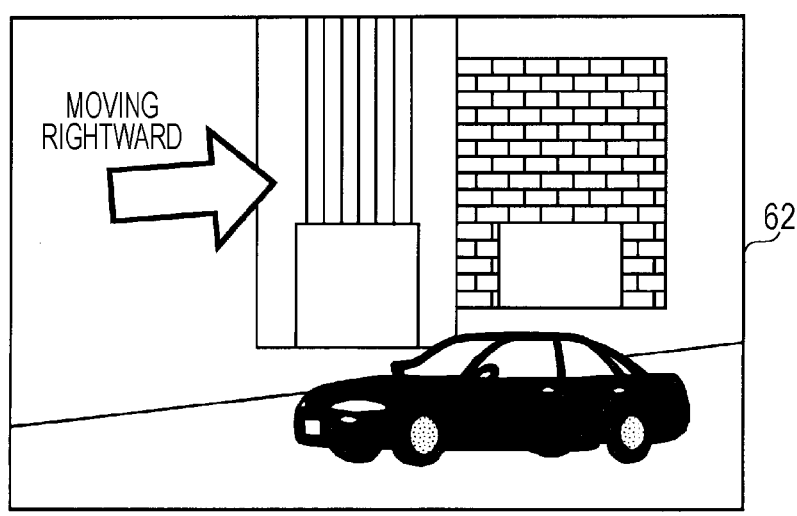
FIG. 9B illustrates an example of another moving image.
Figure 10A:
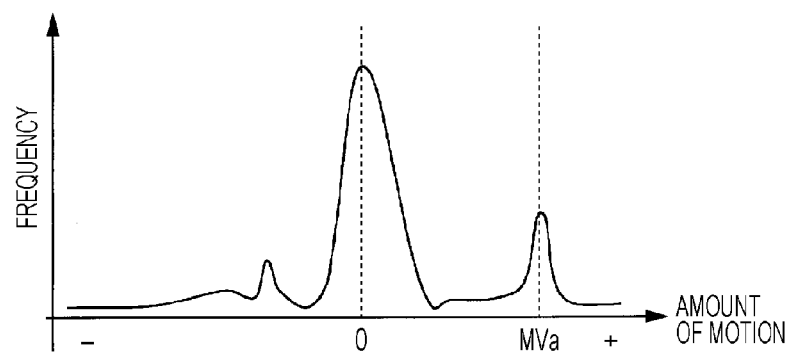
FIG. 10A illustrates the histogram of a motion vector of the image of FIG. 9A.
Figure 10B:
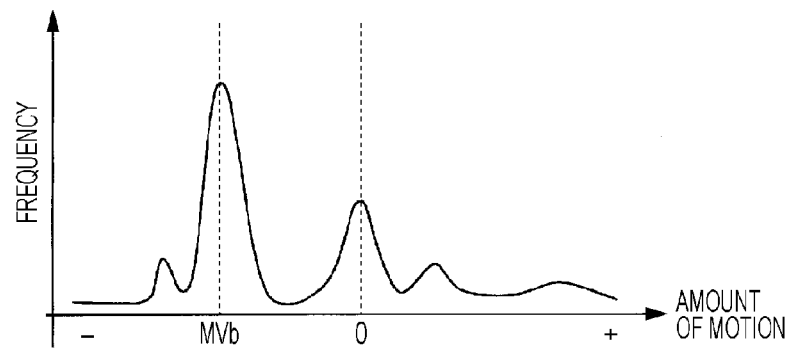
FIG. 10B illustrates the histogram of a motion vector of the image of FIG. 9B.

An area delineation operation is described below. In order to generate an accurate three-dimensional display image, an object area needs to be accurately delineated from a background area in an image when depth information of the image is estimated. FIG. 9A and FIG. 9B illustrate examples of moving images. FIG. 10A and FIG. 10B illustrate histograms of motion vectors of these two pages of image.

In an image 61 of FIG. 9A, a background image remains still while an object (automobile) moves leftward in front of the background. In the histogram of FIG. 10A, a maximum frequency peak is found close at an amount of motion of zero, and another frequency peak is found close at an amount of motion of MVa. The image 61 is interpreted to mean that the amount of motion of the background is zero, and that the amount of motion of the object is MVa. A block close to the amount of motion of 0 may be sorted as a background area and a block close to the amount of motion of MVa may be sorted as an object area.

In an image 62 of FIG. 9B, an object (automobile) remains still while a background image behind the object moves rightward. Such an image may be captured when a user keeps track of a moving object with a camera. In the histogram of FIG. 10B, a maximum peak frequency is found close at an amount of motion of MVb, and another frequency peak is found close at an amount of motion of 0. The image 62 may be interpreted to mean that the amount of motion of the background is MVb and that the amount of motion of the object is 0. A block close to the amount of motion of MVb may be sorted as a background area and a block close to the amount of motion of 0 may be sorted as an object area.

The object image is thus accurately separated from the background image in the image by sorting blocks depending on the size of each motion vector. In order to delineate the area of the image in this way, the depth information estimating unit 31 includes the motion block estimating unit 53.

Figure 11:
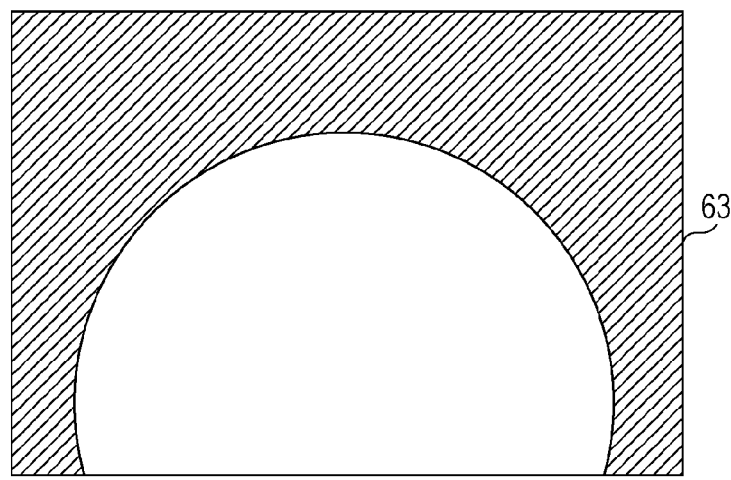
FIG. 11 illustrates a portion of an image estimated as background.

A method of estimating the depth of the image is described next below. It is likely that an upper and side portion of an image 63 (hatched portion) of FIG. 11 is the background. The depth information estimating unit 31 ranks objects, determined in the area delineation process of the image, in terms of order of screen position in a depth direction. In addition to this operation, the depth information estimating unit 31 estimates depth information DP in accordance with the area of an object, luminance/hue information of the object, high/low region information of the object, and the like. For example, depending on the area of the object, the depth information estimating unit 31 may estimate that an object having a larger area in the center of the image is located in front, and that an object having a larger area in the side portion of the image is located behind. Depending on the luminance/hue information of the object, the depth information estimating unit 31 may estimate that an object having a higher luminance or having a hue closer to the primary colors is located in front. In view of the fact that the background is typically blurred, the depth information estimating unit 31 may refer to the high/low region information of the object, and may estimate that an object having a larger number of high region components is located in front.

Figure 12:
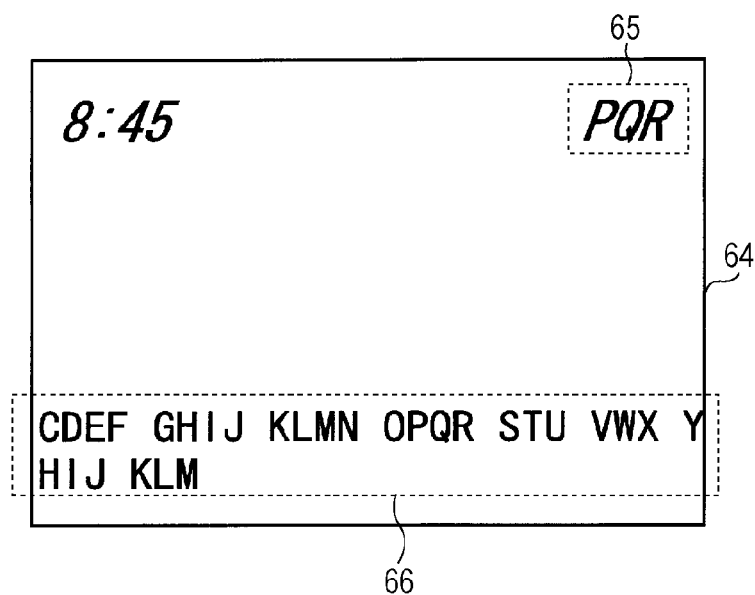
FIG. 12 illustrates an example of image including characters.

Discussed next is how to handle a character in the image. FIG. 12 illustrates an example of image including characters. An image 64 of FIG. 12 includes still characters 65 and a telop 66. When an image including characters is three-dimensionally displayed, characters are preferably separated from the other portion of the image, and are then always displayed at the same depth position. To process the characters in this way, the depth information estimating unit 31 includes the telop area extracting unit 54 and the still character extracting unit 55.

The elements included in the depth information estimating unit 31 perform operations described below. The vector information analyzing unit 51 generates vector statistical information ST in accordance with the motion vector V1 detected by the motion vector detecting unit 12. The vector statistical information ST includes the histogram of, the mean value of, and the variance of the motion vectors V1. The luminance/hue converting unit 52 converts the image signal represented by the input image X(n) into a luminance signal and a hue signal.

The motion block estimating unit 53 segments the image in response to the size of a vector based on the vector statistical information ST, and then determines the area of each object. The telop area extracting unit 54 extracts a telop area in accordance with the vector statistical information ST, and outputs position information of the telop area. For example, if a telop moving horizontally is typically located in a bar-shaped portion on the bottom of the image. In view of this, if blocks having substantially equal motion vectors are distributed in a bar-shaped portion on the bottom of the image, the telop area extracting unit 54 extracts these portions as a telop area. If the telop area includes small blocks having equal motion vector, the telop area extracting unit 54 extracts the small blocks as a telop character area. The still character extracting unit 55 extracts a still character area (for example, an area containing logo of a television program), and outputs position information of the still character.

The high/low region determining unit 56 determines a high region and a low region of the luminance signal and the hue signal, determined by the luminance/hue converting unit 52, on a per block basis in accordance with the information determined by the motion block estimating unit 53, the telop area extracting unit 54, and the still character extracting unit 55 (hereinafter referred to as three types of information). In accordance with the three types of information, the luminance/hue determining unit 57 determines, on a per block basis, the mean value of luminance and the mean value of hue respectively based on the luminance signal and the hue signal determined by the luminance/hue converting unit 52. The depth information generating unit 58 determines a depth priority of each block in accordance with the three types of information, the high/low region information determined by the high/low region determining unit 56, and the luminance/hue information determined by the luminance/hue determining unit 57. The depth information generating unit 58 thus determines depth information DP. The parallax vector generating unit 59 determines the parallax vector V3 in accordance with the depth information DP.

The configuration of the depth information estimating unit 31 has been described above for exemplary purposes only. The depth information estimating unit 31 may estimate the parallax vector V3 of the input image X(n) using any method in accordance with the input image X(n).

Figure 13:
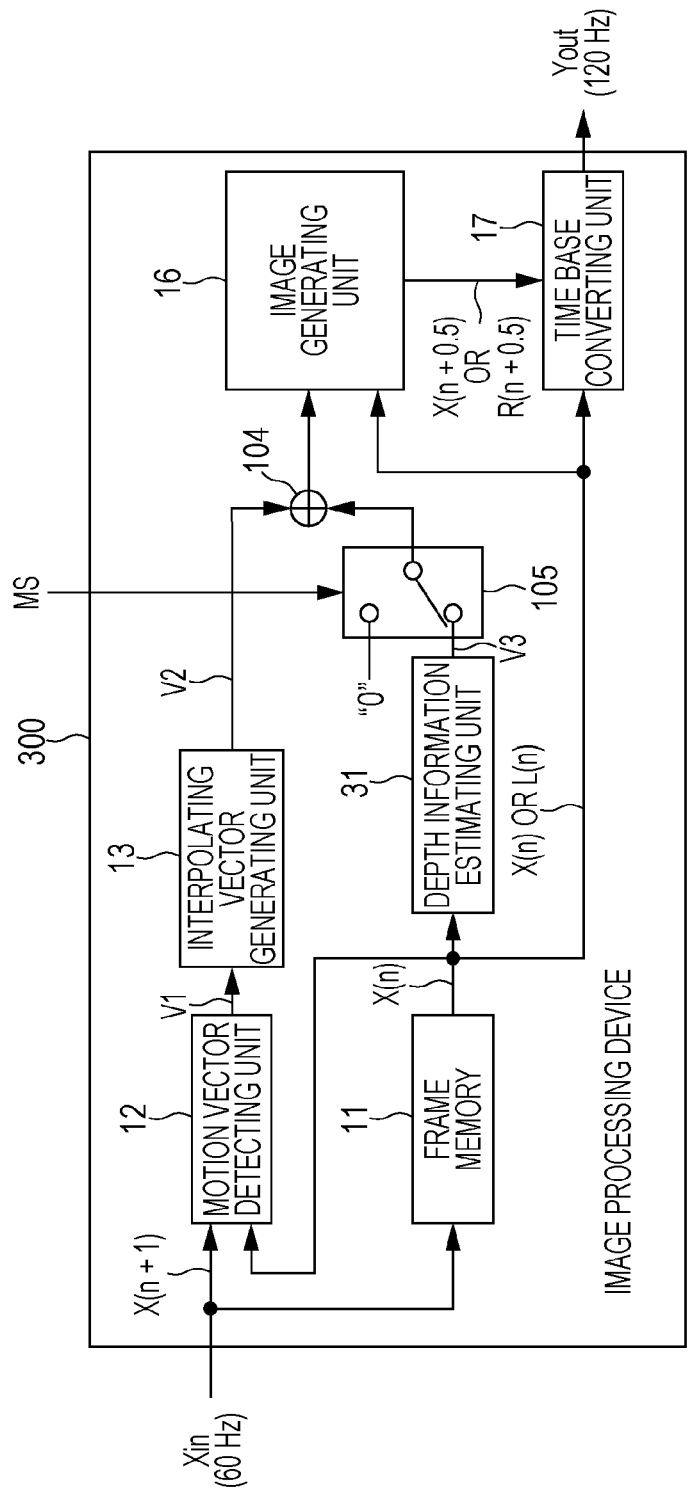
FIG. 13 is a block diagram illustrating the configuration of an image processing device as a modification of the image processing device of the third embodiment of the present invention.

The present embodiment may be modified to a modification example of FIG. 13. In an image processing device 300 of FIG. 13, the vector summing unit 104 and the vector selecting unit 105 work as a vector generating unit that outputs, as a vector for use in the image generating, the interpolating vector in the two-dimensional display mode and outputs the sum of the interpolating vector and the parallax vector in the three-dimensional display mode. The image processing device 300 thus operates in the same way as the image processing device 30 and provides the same effects as those of the image processing device 30.

Fourth Embodiment

Figure 14:
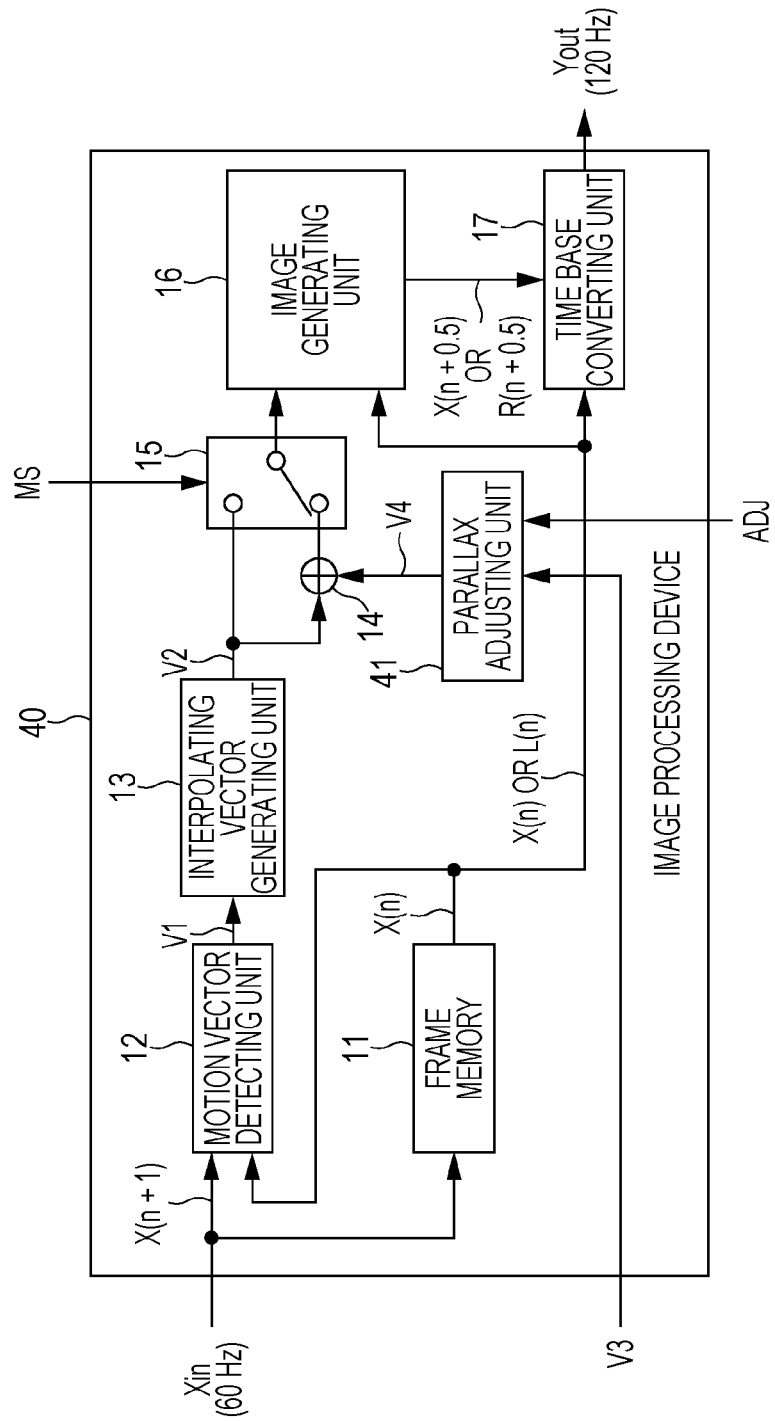
FIG. 14 is a block diagram illustrating the configuration of the image processing device of a fourth embodiment of the present invention.

FIG. 14 is a block diagram illustrating the configuration of the information processing device of a fourth embodiment of the present invention. The image processing device 40 of FIG. 14 is the image processing device 10 (FIG. 1) of the first embodiment but with a parallax adjusting unit 41 added thereto. Like the image processing device 10, the image processing device 40 is used in a built-in state in the liquid-crystal display apparatus 1 (FIG. 2).

The image processing device 40 receives an image signal Xin, parallax vector V3, adjustment information ADJ, and a mode selection signal MS. The parallax vector V3 and the adjustment information ADJ are input to the parallax adjusting unit 41. The parallax adjusting unit 41 varies the parallax vector V3 in accordance with the adjustment information ADJ, thereby outputting an adjusted parallax vector V4.

The vector summing unit 14 sums the interpolating vector V2 and the adjusted parallax vector V4. The sum (V2+V4) of the interpolating vector and the adjusted parallax vector determined by the vector summing unit 14 is applied to the vector selecting unit 15. The vector selecting unit 15 selects the interpolating vector V2 in response to the mode selection signal MS in the two-dimensional display mode, and selects the sum (V2+V4) of the interpolating vector and the adjusted parallax vector in the three-dimensional display mode.

The image generating unit 16 operates in the same way as in the first embodiment. In the three-dimensional display mode, however, the image generating unit 16 generates the right-eye image R(n+0.5) in accordance with the sum (V2+V4) of the interpolating vector and the adjusted parallax vector and the input image X(n). Like the image processing device 10, the image processing device 40 performs in this way the speed-doubling conversion process to double the frame rate of the image in the two-dimensional display mode, and performs the three-dimensional conversion process to convert a page of input image into a page of left-eye image and a page of right-eye image in the three-dimensional display mode.

The adjustment information ADJ is used to adjust an amount of projection and an amount of depth in the three-dimensional display. For example, the adjustment information ADJ may be specified by a user of the image processing device 40. For example, the parallax adjusting unit 41 may determine gain in accordance with the adjustment information ADJ, and may then multiply the determined gain by the parallax vector V3. The parallax vector is easily varied in this way so that the amount of projection in the three-dimensional display is easily uniformly increased (or decreased).

Alternatively, the parallax adjusting unit 41 may determine an offset in accordance with the adjustment information ADJ, and may add the determined offset to the parallax vector V3. In this way, switching in the three-dimensional display between placing a priority on the projection and placing a priority on the depth is easily performed by varying the parallax vector easily.

Alternatively, the parallax adjusting unit 41 may perform on the parallax vector V3 an operation different depending on a location in the image, in accordance with the adjustment information ADJ. The parallax adjusting unit 41 may vary the gain, specified by the adjustment information ADJ, on a per block basis and then may multiply the resulting gain by the parallax vector V3. In this way, the amount of projection in the three-dimensional display is adjusted depending on the location in the image by varying the parallax vector appropriately depending on the location in the image. For example, when the three-dimensional display is presented, this arrangement facilitates a process of increasing the amount of projection in the center portion of the image and decreasing the amount of projection on the side portion of the image.

Figure 15A:
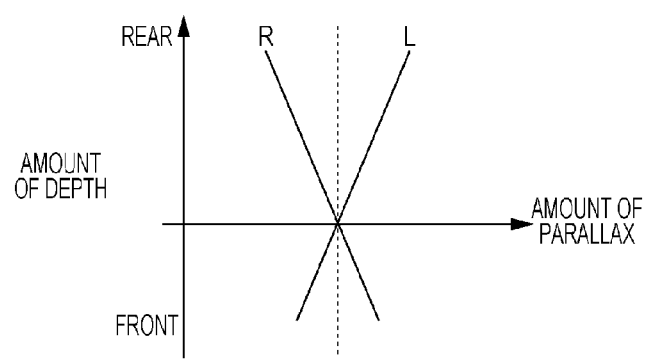
FIG. 15A illustrates a relationship between parallax and depth of a third-dimension display image.
Figure 15B:
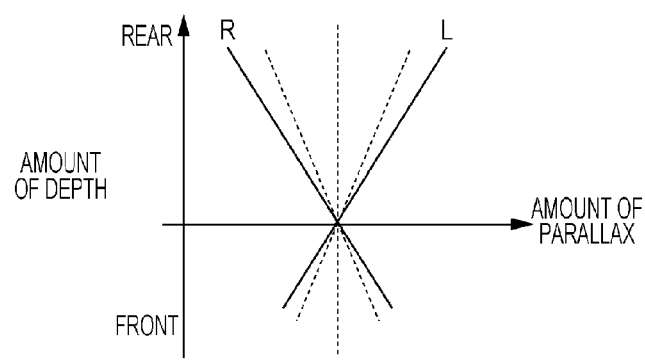
FIG. 15B illustrates the relationship between parallax and depth of in the image processing device of FIG. 14 obtained when a parallax vector is multiplied by gain.
Figure 15C:
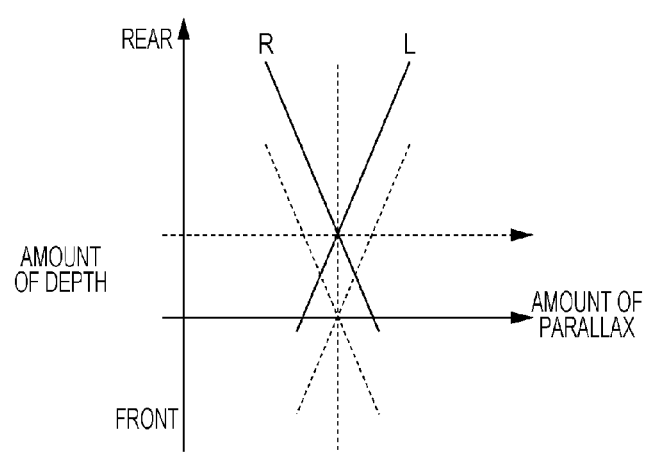
FIG. 15C illustrates the relationship between parallax and depth of in the image processing device of FIG. 14 as a result of addition of an offset to the parallax vector.

FIG. 15A through FIG. 15C illustrate a relationship between parallax and depth in the three-dimensional display image. FIG. 15A illustrates the relationship between parallax and depth in the three-dimensional display image on the left-eye image (labeled L) and the right-eye image (labeled R) during a standard setting. If the parallax adjusting unit 41 multiples the parallax vector V3 by a gain, the relationship between parallax and depth becomes as illustrated in FIG. 15B. In this case, the parallax increases both at a rear position and at a front position, and both the amount of projection and the amount of depth increase. If the parallax adjusting unit 41 adds an offset to the parallax vector V3, the relationship between parallax and depth becomes as illustrated in FIG. 15C. In this case, a reference plane (a plane having an amount of depth 0) where the left-eye image and the right-eye image intersect each other appears more front than in the standard setting. An image with a priority placed on the depth (an image with the amount of projection reduced) results in this case.

As described above, the image processing device 40 of the present embodiment includes the parallax adjusting unit 41, the vector summing unit 14, and the vector selecting unit 15. The parallax adjusting unit 41 varies the parallax vector V3 in accordance with the adjustment information ADJ. The vector summing unit 14 sums the interpolating vector V2 and the adjusted parallax vector V4. The vector selecting unit 15 selects between the interpolating vector V2 and the sum (V2+V4) of the interpolating vector and the adjusted parallax vector. The vector summing unit 14, the vector selecting unit 15, and the parallax adjusting unit 41 work as a vector generating unit that outputs, as a vector for use in the image generating, the interpolating vector in the two-dimensional display mode and outputs the sum of the interpolating vector and the adjusted parallax vector in the three-dimensional display mode.

In the image processing device 40 of the present embodiment, as in the first through third embodiments, the image generating unit is shared in the frame rate conversion process and the three-dimensional conversion process, the right-eye image (or the left-eye image) included in the three-dimensional display image is generated at an motion-compensated interpolation position in the time axis. The image processing device 40 thus improves the image quality of the moving image displaying with a smaller amount of circuit while performing the three-dimensional conversion process with the smaller amount of circuit. In addition, the amount of projection in the three-dimensional display is easily adjusted by varying the parallax vector in accordance with the adjustment information.

Figure 16:
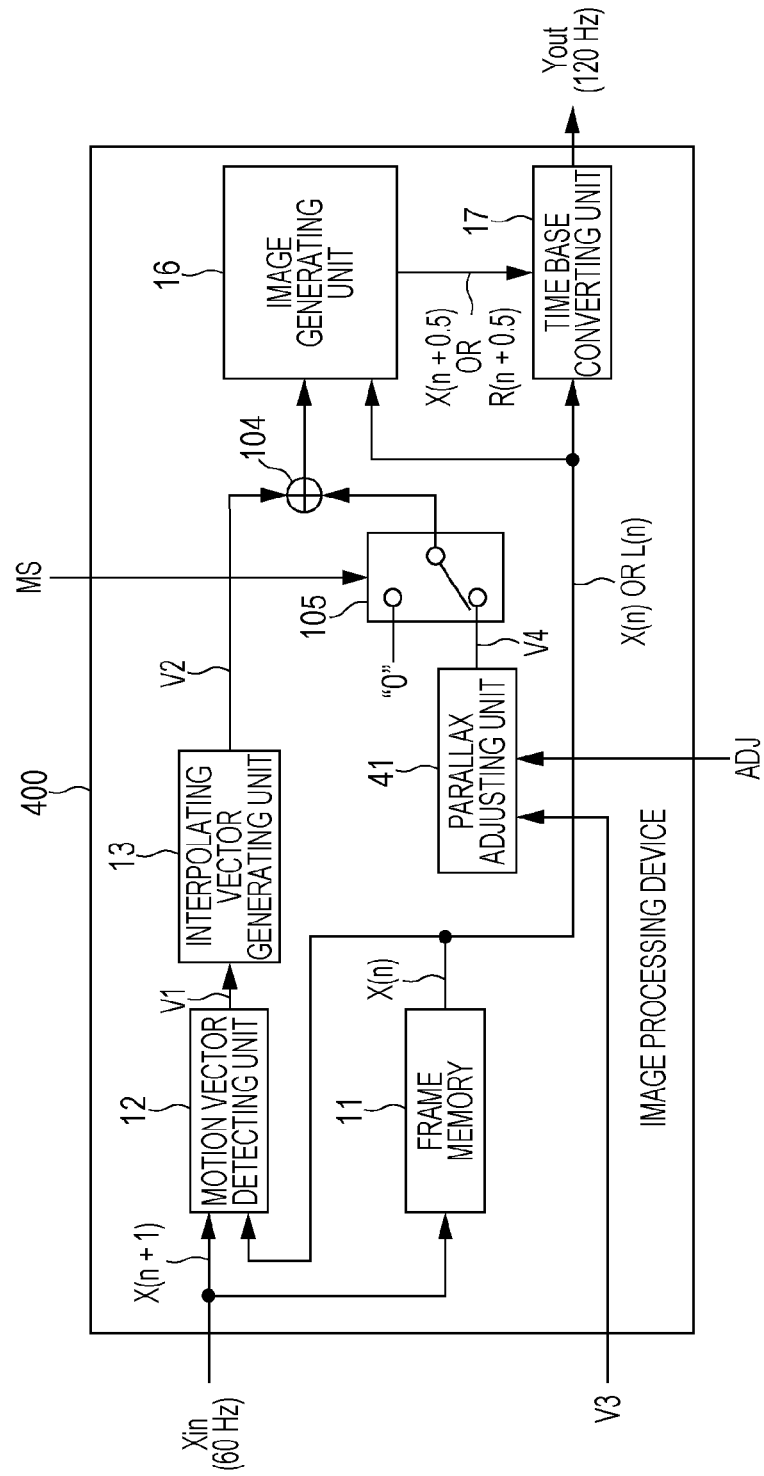
FIG. 16 is a block diagram illustrating the configuration of an image processing device as a modification of the image processing device the fourth embodiment of the present invention.

The present embodiment may be modified to a modification example of FIG. 16. In an image processing device 400 of FIG. 16, the parallax adjusting unit 41 varies the parallax vector V3 input from the outside in accordance with the adjustment information ADJ. The vector selecting unit 105 selects a zero vector in the two-dimensional display mode, and selects the adjusted parallax vector V4 determined by the parallax adjusting unit 41 in the three-dimensional display mode. The vector summing unit 104 sums the adjusted parallax vector V4 generated by the interpolating vector generating unit 13 and the vector selected by the vector selecting unit 105. In the image processing device 400, the parallax adjusting unit 41, the vector summing unit 104, and the vector selecting unit 105 work as a vector generating unit that outputs, as a vector for use in the image generating, the interpolating vector in the two-dimensional display mode and outputs the sum of the interpolating vector and the adjusted parallax vector in the three-dimensional display mode. The image processing device 400 thus operates in the same way as the image processing device 40 and provides the same effects as those of the image processing device 40.

In the above discussion, the parallax adjusting unit 41 is added to the image processing device 10 of the first embodiment. Optionally, the parallax adjusting unit 41 may be added to each of the image processing devices 20 and 30 of the second and third embodiments. The image processing devices of these modifications increase the image quality of the moving image displaying while performing the three-dimensional conversion process with a smaller amount of circuit. In addition, the amount of projection in the three-dimensional display is easily adjusted by varying the parallax vector in accordance with the adjustment information.

In the above discussion, each of the image processing devices of the first through fourth embodiments performs the speed-doubling conversion process to double the frame rate of the image in the two-dimensional display mode, and performs the three-dimensional conversion process to convert the one page of input image into the one page of left-eye image and the one page of right-eye image in the three-dimensional display mode. The image processing device of the present invention may perform a speed-multiplied-by-2m conversion process to multiply the frame rate of the image by 2m in the two-dimensional display mode (m is an integer equal to or above 2), and perform a three-dimensional conversion process to convert a page of input image into m pages of left-eye image and m pages of right-eye image in the three-dimensional display mode.

For example, the image processing device 10 of the first embodiment may selectively perform the speed-multiplied-by-2m conversion process and the three-dimensional display mode corresponding to the speed-multiplied-by-2m conversion process as described below. In this case, the interpolating vector generating unit 13 generates (2m−1) interpolating vectors V2 in response to one page of input image. When the right-eye image is generated in the three-dimensional display mode, the parallax vector V3 is input from the outside. Otherwise, the zero vector is input from the outside. The vector selecting unit 15 performs the selection operation by (2m−1) times in response to one page of input signal. In the two-dimensional display mode, the vector selecting unit 15 selects the interpolating vector V2. When the left-eye image is generated in the three-dimensional display mode, the vector selecting unit 15 selects the interpolating vector V2. When the right-eye image is generated in the three-dimensional display mode, the vector selecting unit 15 selects the sum (V2+V3) of the interpolating vector and the parallax vector. The image generating unit 16 successively generates (2m−1) pages of interpolated image in response to (2m−1) interpolating vectors V2 and the input image in the two-dimensional display mode. In the three-dimensional display mode, the image generating unit 16 generates (m−1) pages of image for the same eye as the input image, and m pages of image for the opposite eye in accordance with (2m−1) vectors selected by the vector selecting unit 15 and the input image. In this way, the image processing device 10 of the first embodiment performs the speed-multiplied-by-2m conversion process to multiply the frame rate of the image by 2m in the two-dimensional display mode, and performs the three-dimensional conversion process to convert the page of input image into the m pages of left-eye image and the m pages of right-eye image in the three-dimensional display mode.

For example, if the image processing device 10 selectively performs a speed four-time multiplication conversion process and a three-dimensional conversion process corresponding to the speed four-time multiplication conversion process, the interpolating vector generating unit 13 generates three interpolating vectors V2 in response to one page of input image. The vector selecting unit 15 performs a selection operation by three times on the one page of input image. The image generating unit 16 successively generate three interpolated images in accordance with the three interpolating vectors V2 and the input image in the two-dimensional display mode. In the three-dimensional display mode, the image generating unit 16 generates one page of left-eye image and two pages of right-eye image in accordance with the three vectors selected by the vector selecting unit 15 and the input image.

If three-dimensional display eye glasses support the speed-doubling conversion process, the vector selecting unit 15 performs the selection operation by three times in the three-dimensional display mode. In this case, the vector selecting unit 15 selects the interpolating vector V2 and then selects twice the sum (V2+V3) of the interpolating vector and the parallax vector. Also in this case, in response to one page of input image X(n), the image processing device 10 outputs a left-eye image L(n) at the location of an n-th frame, a left-eye image L(n+0.25) at the location of an (n+0.25)-th frame, a right-eye image R(n+0.5) at the location of an (n+0.5)-th frame, and a right-eye image R(n+0.75) at the location of an (n+0.75)-th frame.

If three-dimensional display eye glasses support the speed four-time multiplication conversion process, the vector selecting unit 15 performs the selection operation by three times in the three-dimensional display mode. In this case, the vector selecting unit 15 selects the sum (V2+V3) of the interpolating vector and the parallax vector first, then selects the interpolating vector V2, and finally selects the sum (V2+V3) of the interpolating vector and the parallax vector again. Also in the three-dimensional display mode, in response to one page of input image X(n), the image processing device 10 successively outputs a left-eye image L(n) at the location of an n-th frame, a right-eye image R(n+0.25) at the location of an (n+0.25)-th frame, a left-eye image L(n+0.5) at the location of an (n+0.5)-th frame, and a right-eye image R(n+0.75) at the location of an (n+0.75)-th frame.

When an image signal Xin representing a still image is input to each of the image processing devices of the first through fourth embodiments and of the modifications thereof, the motion vector V1 detected by the motion vector detecting unit 12 becomes a zero vector, and the interpolating vector V2 detected by the interpolating vector generating unit 13 also becomes a zero vector. In the two-dimensional display mode, the interpolated image generated by the image generating unit 16 matches the input image. Typically, the parallax vector V3 then input from the outside (or the interpolating vector V3 detected by the depth information estimating unit 31) is not a zero vector. In the three-dimensional display mode, the right-eye image generated by the image generating unit 16 typically fails to match the left-eye image. If a still image is input to each of the image processing devices of the first through fourth embodiments and the modifications thereof in the three-dimensional display mode, the image processing device outputs a three-dimensional display image including the left-eye image and the right-eye image different from the left-eye image.

As described above, in the image processing device, the image processing method, the image display apparatus, and the image display method of the present invention, the image generating unit is shared in the frame rate conversion process and the three-dimensional conversion process, and one of the left-eye image and the right-eye image is generated at the same location as the interpolated image in the time axis. The image quality of the moving image displaying is thus improved with a smaller amount of circuit.

INDUSTRIAL APPLICABILITY

Since the image processing device, the image processing method, the image display apparatus, and the image display method of the present invention provide the feature that the image quality of the moving image displaying is increased with a smaller amount of circuit, the image processing device, the image processing method, the image display apparatus, and the image display method find applications as a variety of types of image processing device, image processing method, image display apparatus, and image display method, configured to selectively perform the frame rate conversion process and the three-dimensional conversion process.

REFERENCE SIGNS LIST

1 Liquid-crystal display apparatus
2 Timing control circuit
3 Scanning signal line drive circuit
4 Data signal line drive circuit
5 Liquid crystal panel
6 (pxq) pixel circuits
10, 20, 30, 40, 100, 200, 300, and 400 Image processing devices
11 Frame memory
12 Motion vector detecting unit
13 Interpolating vector generating unit
14 and 104 Vector summing units
15 and 105 Vector selecting units
16 Image generating unit
17 Time base converting unit
21 Parallax vector extracting unit
31 Depth information estimating unit
41 Parallax adjusting unit

The invention claimed is:

1. An image processing device that selectively executes a frame rate conversion process and a three-dimensional conversion process, comprising
a vector detecting unit that detects a motion vector of an input image,
an interpolating vector generating unit that, in accordance with the motion vector, generates an interpolating vector needed for the frame rate conversion process,
a vector generating unit that, as a vector for use in image generating, outputs the interpolating vector in a two-dimensional display mode, and outputs a sum of a parallax vector needed for the three-dimensional conversion process, and the interpolating vector in a three-dimensional display mode, and
an image generating unit that, in accordance with the vector for use in the image generating and the input image, generates an image that is to be output together with the input image,
wherein in the two-dimensional display mode, the input image is output as an original image, and the image generating unit generates an interpolated image while in the three-dimensional display mode, the input image is output as one of a left-eye image and a right-eye image included in a three-dimensional display image, and the image generating unit generates another image included in the three-dimensional display image.

2. The image processing device according to claim 1, wherein the vector generating unit comprises a vector summing unit that sums the interpolating vector and the parallax vector, and
a vector selecting unit that selects between the interpolating vector and the vector determined by the vector summing unit.

3. The image processing device according to claim 1, wherein the parallax vector is input separately from an image signal representing the input image.

4. The image processing device according to claim 1, wherein the parallax vector with an image signal representing the input image attached thereto is input.

5. The image processing device according to claim 1, further comprising a depth information estimating unit that generates the parallax vector in accordance with the input image.

6. The image processing device according to claim 1, wherein the vector generating unit comprises a parallax adjusting unit that varies the parallax vector in accordance with adjustment information that is provided.

7. The image processing device according to claim 6, wherein the vector generating unit further comprises
a vector summing unit that sums the interpolating vector and a vector determined by the parallax adjusting unit, and
a vector selecting unit that selects between the interpolating vector and the vector determined by the vector summing unit.

8. The image processing device according to claim 6, wherein the parallax adjusting unit multiples the parallax vector by a gain in accordance with the adjustment information.

9. The image processing device according to claim 6, wherein the parallax adjusting unit adds an offset to the parallax vector in accordance with the adjustment information.

10. The image processing device according to claim 6, wherein the parallax adjusting unit performs on the parallax vector an operation different depending on a location in an image in accordance with the adjustment information.

11. The image processing device according to claim 1, wherein the image generating unit generates a page of the interpolated image in response to a page of the input image in the two-dimensional display mode, and generates a page of image for an eye opposite the input image in response to the page of the input image in the three-dimensional display mode.

12. The image processing device according to claim 1, wherein the image generating unit generates (2m−1) pages of the interpolated image in response to a page of the input image in the two-dimensional display mode (m is an integer equal to or above 2), and generates (m−1) pages of for the same eye as the input image in response to the page of the input image, and m pages of image for the opposite eye in the three-dimensional display mode.

13. An image processing method configured to selectively execute a frame rate conversion process and a three-dimensional conversion process, comprising
a step of detecting a motion vector of an input image,
a step of generating, in accordance with the motion vector, an interpolating vector needed for the frame rate conversion process,
a step of outputting, as a vector for use in image generating, the interpolating vector in a two-dimensional display mode, and outputting a sum of a parallax vector needed for the three-dimensional conversion process, and the interpolating vector in a three-dimensional display mode, and
a step of generating, in accordance with the vector for use in the image generating and the input image, an image that is to be output together with the input image,
wherein in the two-dimensional display mode, the input image is output as an original image, and an interpolated image is generated in the step of generating the image while in the three-dimensional display mode, the input image is output as one of a left-eye image and a right-eye image included in a three-dimensional display image, and another image included in the three-dimensional display image is generated in the step of generating the image.

14. An image display apparatus that displays an image by selectively executing a frame rate conversion process and a three-dimensional conversion process, comprising a display panel, an image processing device that selectively executes the frame rate conversion process and the three-dimensional conversion process on an input image, and a drive circuit that drives the display panel so that an image output from the image processing device is displayed, wherein the image processing device comprises a vector detecting unit that detects a motion vector of the input image, an interpolating vector generating unit that, in accordance with the motion vector, generates an interpolating vector needed for the frame rate conversion process, a vector generating unit that, as a vector for use in image generating, outputs the interpolating vector in a two-dimensional display mode, and outputs a sum of a parallax vector needed for the three-dimensional conversion process, and the interpolating vector in a three-dimensional display mode, and an image generating unit that, in accordance with the vector for use in the image generating and the input image, generates an image that is to be output together with the input image, wherein in the two-dimensional display mode, the input image is output as an original image, and the image generating unit generates an interpolated image while in the three-dimensional display mode, the input image is output as one of a left-eye image and a right-eye image included in a three-dimensional display image, and the image generating unit generates another image included in the three-dimensional display image.

\* \* \* \* \*